Figure 1:
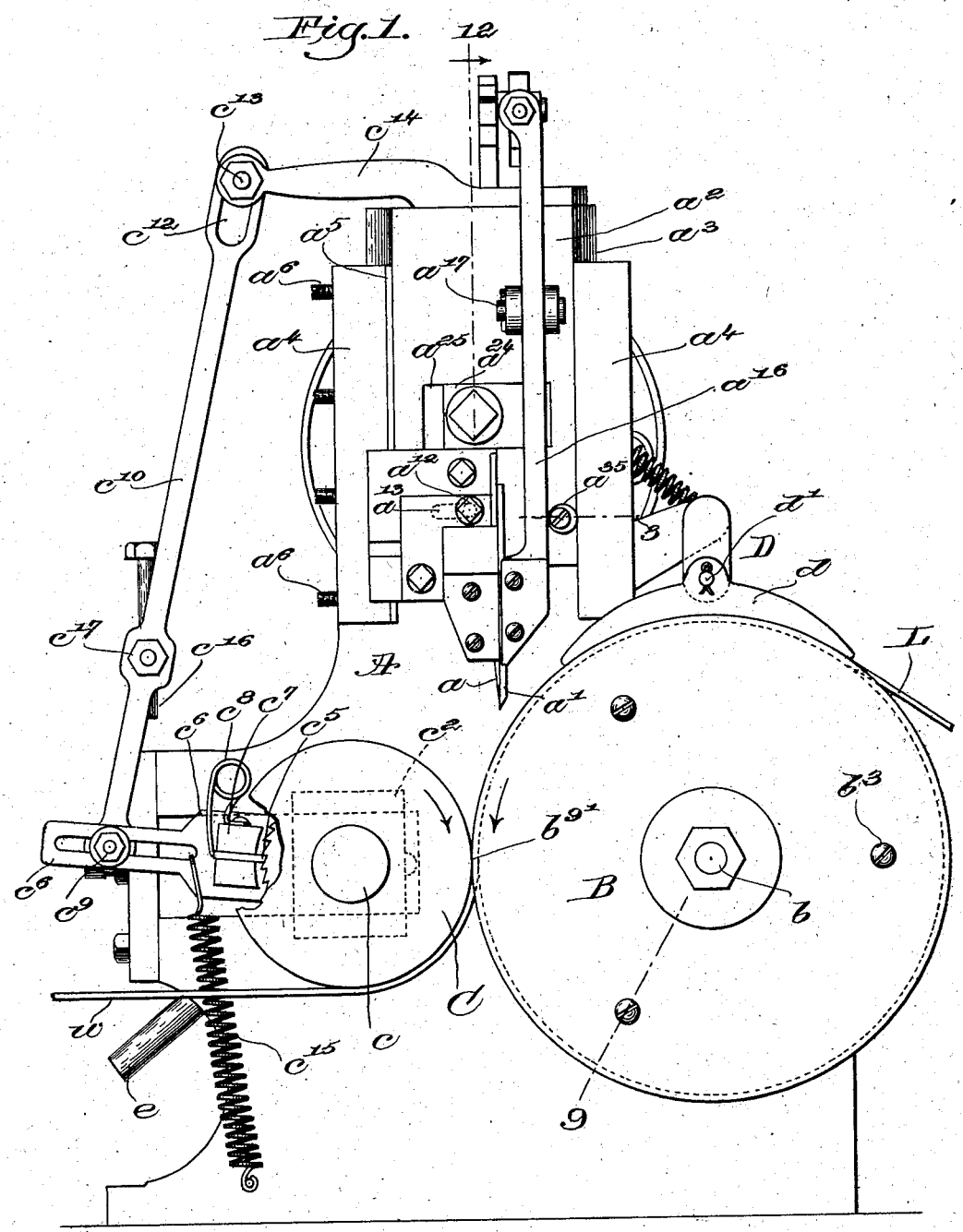

No. 728,532. PATENTED MAY 19, 1903.
W. B. ARNOLD.
WELT CUTTING MACHINE.
APPLICATION FILED DEC. 7, 1901.
NO MODEL. 4 SHEETS—SHEET 1.

Witnesses:
Thomas J. Drummond
Adolph H. Kaiser

Inventor:
William B. Arnold,
by Crosby & Gregory
Attys.

No. 728,532. PATENTED MAY 19, 1903.
W. B. ARNOLD.
WELT CUTTING MACHINE.
APPLICATION FILED DEC. 7, 1901.
NO MODEL. 4 SHEETS—SHEET 3.
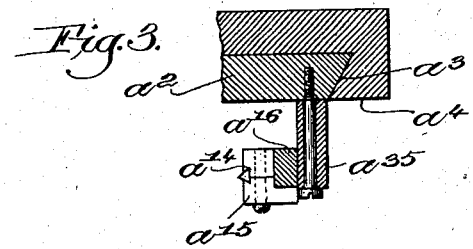
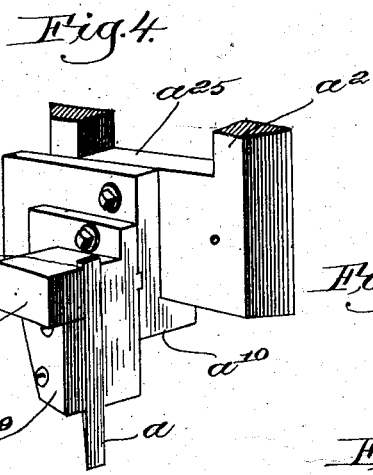
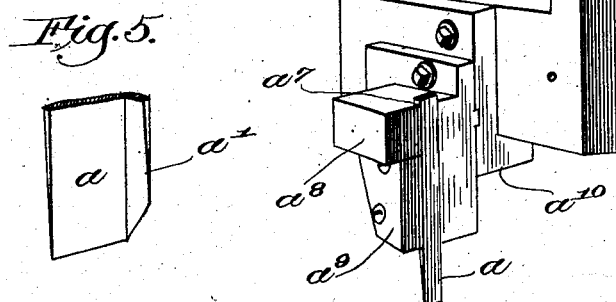
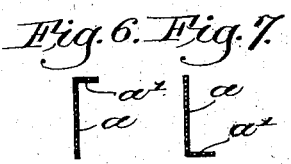
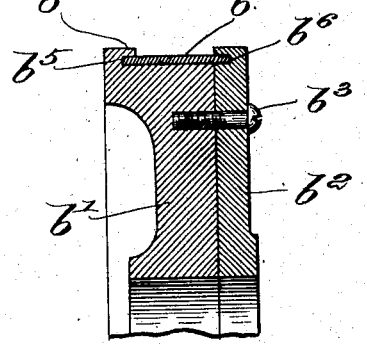
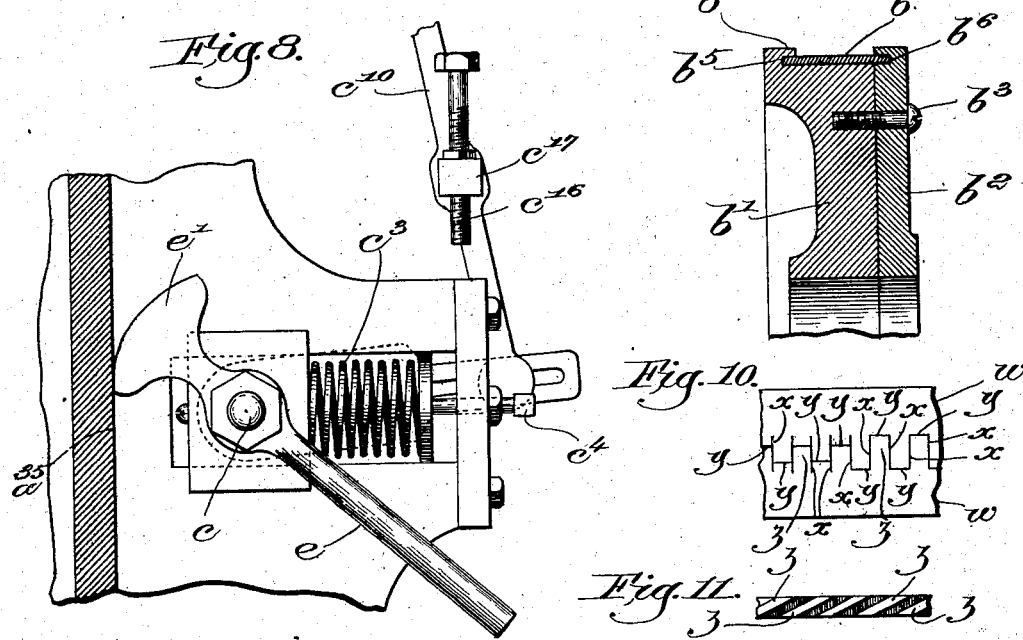
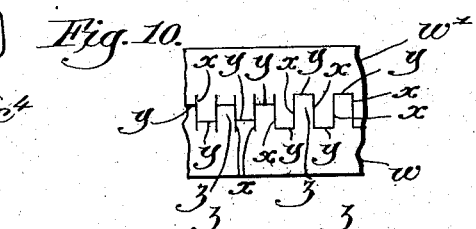
Witnesses.
Thomas K. Drummond
Adolph Kaiser
Inventor.
William B. Arnold,
by Crosby & Gregory
Attys.
THE NORRIS PETERS CO., PHOTO-LITHO., WASHINGTON, D. C.

No. 728,532. PATENTED MAY 19, 1903.
W. B. ARNOLD.
WELT CUTTING MACHINE.
APPLICATION FILED DEC. 7, 1901.
NO MODEL. 4 SHEETS—SHEET 4.
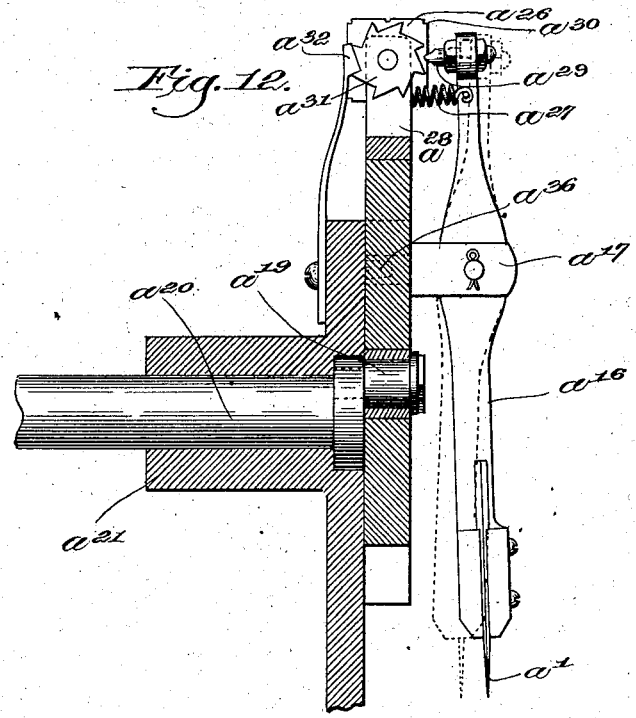
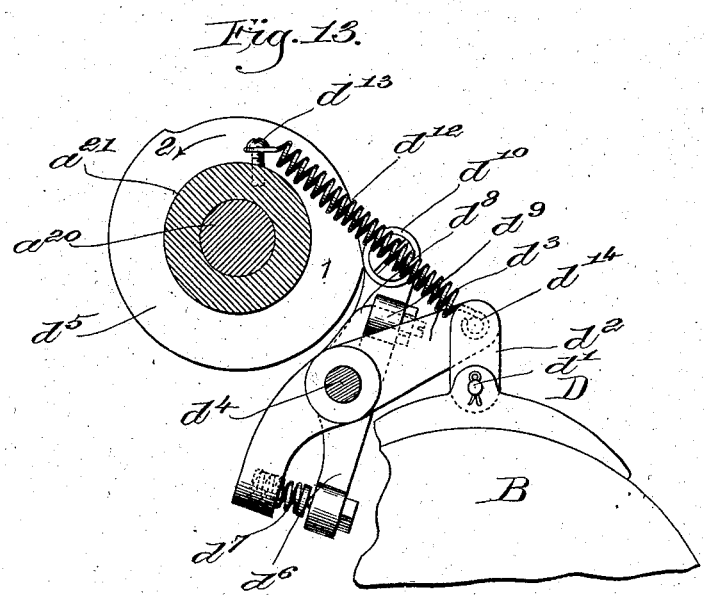

No. 728,532. Patented May 19, 1903.

UNITED STATES PATENT OFFICE.

WILLIAM B. ARNOLD, OF NORTH ABINGTON, MASSACHUSETTS.

WELT-CUTTING MACHINE.

SPECIFICATION forming part of Letters Patent No. 728,532, dated May 19, 1903.

Application filed December 7, 1901. Serial No. 85,005. (No model.)

*To all whom it may concern:*

Be it known that I, WILLIAM B. ARNOLD, a citizen of the United States, residing at North Abington, county of Plymouth, State of Massachusetts, have invented an Improvement in Welt-Cutting Machines, of which the following description, in connection with the accompanying drawings, is a specification, like characters on the drawings representing like parts.

My invention is a machine intended, primarily, for cutting a kind of welt-strips disclosed in my Patent No. 674,831, granted May 21, 1901.

The particular embodiment of my invention herein shown and more definitely set forth in the following description is adapted to cut the rectangular serrations down the middle of a wide strip for severing the same into two welt-strips.

Leather is a peculiar and difficult substance to sever with rapidity and accuracy, inasmuch as the fiber is tenacious and yielding, so that a clean angular cut located precisely as required is hard to make. I have found that it is impracticable to form the angular serrations by an angularly-shaped cutting-die operating upon the leather laid out on a block or table, and accordingly after much experimenting I have devised the herein-described machine, which handles and operates upon the leather in such special manner that the welt is cut with precision and rapidity, all the teeth thereof being clean cut, uniform in size and shape, and the machine can be run indefinitely at full speed without appreciable dulling of the knives, making false cuts, or requiring special attention.

In the preferred embodiment of my invention, as herein shown, I have two knives arranged to operate in contact with each other at the point where the angular cut is to be made, each knife making a straight clean incision, one of the incisions terminating at or against the other and the angularity of the resulting tooth of the welt depending upon the angular position of one blade against the other. These coöperating blades enter the leather held taut and on a slant by intermittingly-acting clamping devices at the opposite sides of the knives, the leather being fed during the upward movement of the cutting mechanism, and also for the particular form of welting herein illustrated I prefer to make the knife which cuts the ends of the teeth movable from side to side, so that alternate cuts are in line with each other and successive cuts parallel to each other.

One reason why the problem of cutting my welting is difficult is because the incisions are not only made transversely of the thickness of the leather or across the grain thereof, but the cuts must be simply incisions without removing any leather, or, in other words, holes are not cut in the leather or openings made; but for perfect work there is simply a continuous incision on a zigzag line directly in the body of the leather, and inasmuch as both strips of the severed leather constitute finished and identical welts the incisions must be equally perfect on both sides, and thus must be equally clean cut on both sides and at the corners, as well as elsewhere.

I am aware that there are machines for cutting fibers and metal and also for punching holes from leather and notching or otherwise cutting into the edge of leather; but in none of these instances are the problems presented or the difficulties met with which it is the purpose of my invention to solve.

I believe that I am the first to invent a machine for cutting a welt-strip of the kind above explained, and I intend this patent to cover, broadly, a machine for doing the work as above outlined, and therefore certain of the appended claims define the invention accordingly.

Figure 2:
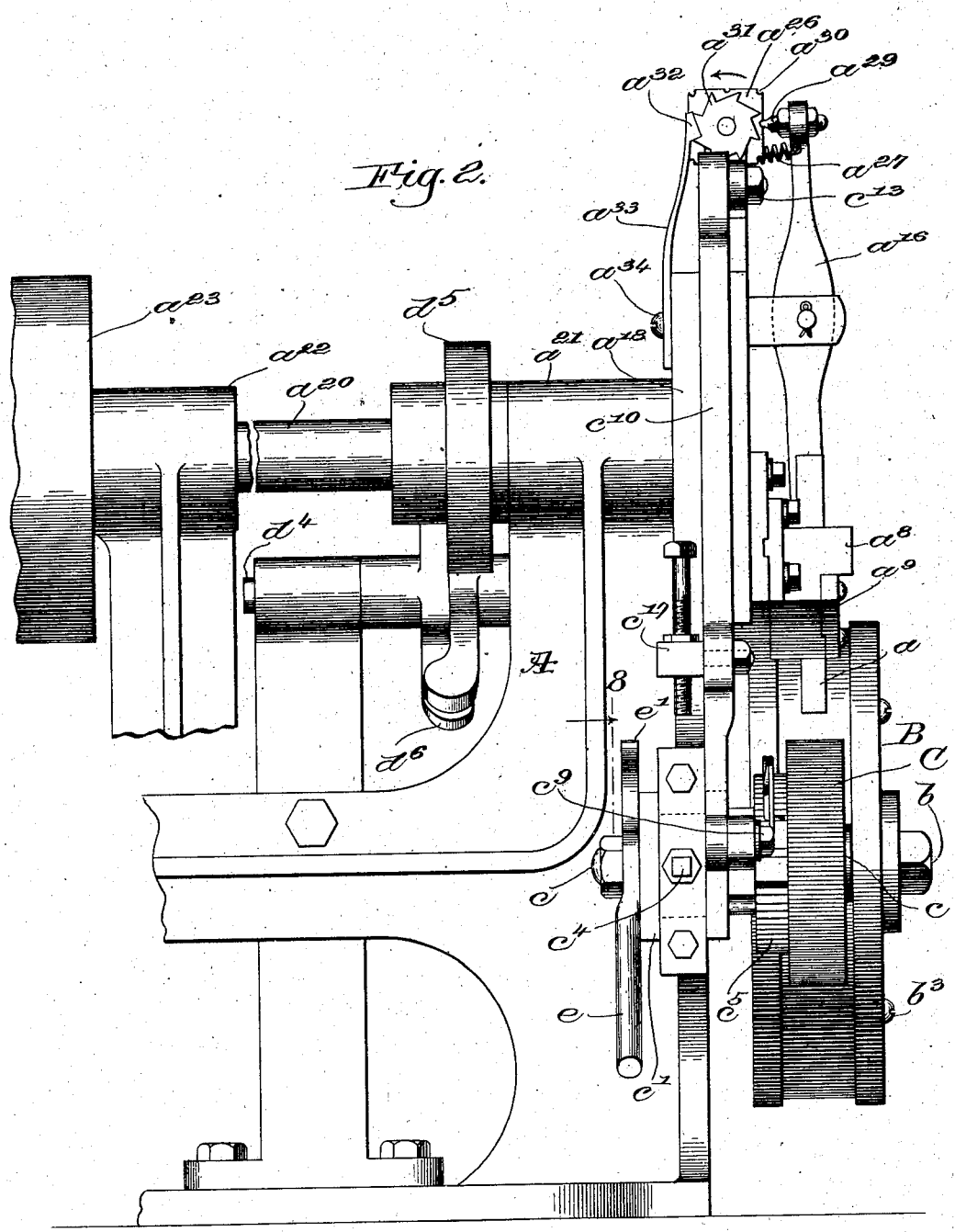

In the drawings, Figure 1 is a view in front elevation of one embodiment of my invention. Fig. 2 is a side elevation thereof viewing the same from the left hand, parts being broken away for purposes of illustration. Fig. 3 is a transverse horizontal sectional detail taken on the line 3, Fig. 1. Fig. 4 is a perspective detail of a fragment of the reciprocating knife-carrier and connected parts. Fig. 5 is a fragmentary view in perspective of the lower ends of the two cutting-knives. Figs. 6 and 7 are cross-sectional views of said knives, showing the same in two positions. Fig. 8 is a vertical sectional view taken on the line 8, Fig. 2, showing details of the feeding mechanism in rear elevation. Fig. 9 is a transverse sectional view on the line 9, Fig. 1. Fig. 10 is a plan view of a fragment of welting, illustrating certain ways in which it may be cut by the machine herein illustrated. Fig. 11 is an inner edge view of one of the severed welt-strips. Fig. 12 is a vertical sectional view taken on the line 12, Fig. 1. Fig. 13 is a cross-sectional view showing in rear elevation the clamping mechanism for holding the welt unyieldingly when attacked by the cutting-knives.

As already intimated, my invention is capable of a variety of embodiments, all, however, operating on the principle and substantially in the manner of the machine which I have herein shown for the purpose of explaining the invention.

The special welt which this machine cuts consists of a strip or ribbon-like body part provided along one edge with thinned-out portions, leaving separated teeth extending slantingly, as shown in Fig. 11, along the edge, and, as herein shown, said teeth are rectangular or provided with blunt ends when viewed in top plan, as in Fig. 10, although not restricted to this shape, and the principle upon which the machine operates is to cut along the middle of a wide strip to form simultaneously two strips of welt with their teeth interlocked without removing any leather by a continuous succession of cuts transversely of the strip and alternate longitudinal cuts, first at or adjacent one end of a transverse cut on one side thereof and then at or adjacent its opposite end on the opposite side thereof, these alternate longitudinal cuts extending in each instance from one transverse cut to the next and severing the narrow neck of leather to form a welt-tooth, and although the main requirement is merely to provide means for making alternate longitudinal cuts, first adjacent one vertical edge of the transverse cutter or of a cut made thereby and the next time adjacent the opposite vertical edge of said transverse cutter or of a cut made thereby, I prefer to accomplish this by means of two knives or cutters, both of which constantly reciprocate in unison, the transverse cutter reciprocating in the same path and the longitudinal cutter shifting first adjacent one edge thereof for forming the tooth of one welt-strip and then on the next reciprocation shifting adjacent the opposite edge thereof for forming a tooth of the other welt-strip.

Referring to the drawings, these cutters are shown at $a\ a'$, the former being the transverse cutter or knife and the latter being the longitudinal cutter or knife for cutting, respectively, the edge incisions $x$ and $y$, Fig. 10, for forming the teeth $z\ z$ of the two welt-strips $w\ w'$.

As herein shown, both of the cutters $a\ a'$ are reciprocated by a single cutter-carrier $a^2$, having beveled edges $a^3$ traveling in vertical guideways $a^4$, one of the latter being provided with a wear-plate $a^5$, adjustable by screw-bolts $a^6$ for maintaining extreme accuracy of movement.

The knife $a$ is held in a dovetailed way $a^7$ provided in a block $a^8$ and held rigidly in adjustment by a clamp $a^9$, the block $a^8$ being laterally adjustable on a plate $a^{10}$ on the carrier $a^2$ by means of a bolt $a^{12}$ and slot $a^{13}$. The knife $a'$ is similarly held in a dovetail $a^{14}$ (see Fig. 3) by a clamp $a^{15}$ at the lower end of an arm $a^{16}$, pivoted to the carrier $a^2$ at $a^{17}$.

The ways $a^4$ are provided on a face-plate or head-block $a^{18}$ of a convenient frame A and is reciprocated by an eccentric pin or roll $a^{19}$, Fig. 12, on the end of a shaft $a^{20}$, mounted in bearings $a^{21}\ a^{22}$ in the frame A and driven by a belt-pulley $a^{23}$. The eccentric pin or roll $a^{19}$ is provided with a slide-block $a^{24}$, which reciprocates in a slot $a^{25}$, provided in the cutter-carrier $a^2$. At its upper end the arm $a^{16}$ is held constantly against an actuator in the form of a rotary cam $a^{26}$ by a spring $a^{27}$, secured at one end to the arm $a^{16}$ and at its other end to a stand $a^{28}$ on the upper end of the carrier $a^2$ and on which the cam $a^{26}$ is mounted. For convenience the arm $a^{16}$ has an adjustable stud $a^{29}$, whose point engages dwells or notches $a^{30}$ in the edge of the cam $a^{26}$. Said cam has fixed thereon a toothed wheel $a^{31}$, engaged by the hooked end $a^{32}$ of a yielding finger $a^{33}$, fast at $a^{34}$ to the head-block $a^{18}$. The teeth or notches of the wheel $a^{31}$ and the dwells $a^{30}$ of the cam $a^{26}$ are so spaced and arranged that they automatically swing the arm $a^{16}$ alternately backward and forward on successive upward movements of the cutter-carrier $a^2$, so as to bring the knife $a'$ into proper position first on one side of the knife $a$, as shown in Fig. 6, and the next time at the opposite side or edge thereof, as shown in Fig. 7.

The strip of leather to be incised and severed is indicated at L, Fig. 1, and is preferably carried by a rotary support B, mounted on a stub $b$, and shown in Fig. 9 as comprising a back block or body part $b'$ and a front plate $b^2$, secured thereto by screws $b^3$. The back block $b'$ is reduced at its periphery and provided with an overhanging part $b^4$, forming a notch or annular recess $b^5$, and opposite thereto is a similar recess $b^6$ in the plate $b^2$ for retaining a cutting-surface of material $b^7$. The material $b^7$ may be a strip of heavy leather or soft metal for supporting the strip L and receiving the knives $a\ a'$, the leather strip being retained between the overhanging parts or flanges of the parts $b'\ b^2$ at opposite sides of the supporting and receiving surface $b^7$, which constitute an endless guide. Said knives are arranged at one side of the work-support B, so as to approach the same obliquely at an angle corresponding to the obliquity of the teeth $z$, and the surface $b^7$ is such that it coöperates with the cutting edges of the cutters to give a sharp clean incision without dulling the cutters, being sufficiently rigid to prevent yielding of the work to the impact of the cutters, capable of receiving the cutting edges, if necessary, without injury to said edges, and also aiding in preventing the welt-strip from slipping under the movement of the cutters.

It is of advantage to provide a curved support for the strip L, thereby tending to stretch the top surface of the leather or place it under tension, so that when the sharp edges of the cutters enter they are thereby aided in making a clean sharp incision.

The cut strip L is held at $b^9$ between the support B and a feed-roll C.

The roll C is mounted on a stub-shaft $c$, carried by a journal-box $c'$, movable toward and from the support B in ways $c^2$ in the frame A, being normally held pressed forward by a spring $c^3$, whose pressure is regulated by a bolt $c^4$.

On the inner side of the roll C is secured a ratchet $c^5$, consisting of a forked lever $c^6$, in which is a movable jaw $c^7$, held forward by a spring $c^8$, said lever at its inner forked end embracing the shaft $c$, as shown in dotted lines in Fig. 8, and at its outer slotted end adjustably receiving the lower end $c^9$ of a link $c^{10}$, provided with an elongated slot $c^{12}$ at its upper end, in which is loosely mounted a stud $c^{13}$ of an arm $c^{14}$, fast on some reciprocating part of the machine, herein shown as the upper end of the knife-carrier $a^2$. The lever $c^6$ is normally held downwardly by a spring $c^{15}$ and is limited in its downward movement by an adjustable stop $c^{16}$, secured at $c^{17}$ to the link $c^{10}$. Thus it will be seen that upon each downward movement of the cutter-carrier for cutting the spring $c^{15}$ of the feeding mechanism will cause the jaw $c^7$ of the lever $c^6$ to move over the ratchet $c^5$ for such a distance as the stop $c^{16}$ permits the lever $c^6$ to move downwardly, and when the cutter-carrier moves upwardly again it moves the lever $c^6$ in opposition to said spring $c^{15}$ and rotates the feed-roll C forward in the direction of the arrow, thereby feeding the strip exactly the distance necessary for another cut.

It will be observed that the spring $c^3$ is heavy and that the roll C is stationary during the downward or cutting movement of the cutters, this arrangement constituting a convenient form of clamping mechanism for holding the lower portion of the welt rigidly in fixed position while being cut. The upper portion of the strip L is also clamped fast by a clamping device D, which coöperates with the support B for clamping the strip L on said support and also holding the support itself against movement. This device is shown as comprising a clamping-shoe $d$, mounted at $d'$ on a link $d^2$, secured at the free end of a lever $d^3$, (see Figs. 1 and 13,) pivoted on a fixed stud at $d^4$ and actuated at proper intervals by a cam $d^5$ through an intermediate lever $d^6$, also pivoted on the stud $d^4$ and having yielding engagement by means of a spring $d^7$ with the opposite end of the lever $d^3$. The lever $d^3$ is also preferably provided with a lug $d^8$ to be engaged by an adjustable stop $d^9$ on the lever $d^6$ for maintaining the parts in proper snug relation. The cam $d^5$ is fast on the shaft $a^{20}$, and, as shown in Fig. 13, has a reduced portion on its upper side between the points 1 2, during the travel of which over a cam-roll $d^{10}$ of the lever $d^6$ a spring $d^{12}$, shown as secured at $d^{13}$ to the bearing $a^{21}$ and at $d^{14}$ to the lever $d^3$, is permitted to retract the clamping-shoe $d$, the clamping-shoe being held positively downwardly in clamping position at all other times by reason of the enlarged circumference of the cam $d^5$ between the points 2 and 1 on the under side of the cam, as shown in Fig. 13.

When the clamping device D is released, the feeding mechanism operates, and when the clamp D is actuated to hold the strip stationary the feed-roll C is in stationary clamping position for the same purpose, one device clamping the leather strip tightly at one side of the cutters and the other device clamping the strip tightly at the other side of the cutters.

When one strip has been incised or severed and another strip is to be put in place, the roll C and wheel-support B are quickly separated by pulling upwardly on a hand-lever $e$, pivoted on the shaft $c$ of the feeding mechanism and provided at its opposite end with a cam or wedging-head $e'$ for bearing against any convenient stationary part, as a lip $a^{35}$, thereby moving the roll C back against the action of the spring $c^3$, and as this occurs at a time when the shoe $d$ is in raised position it will be evident that a new strip L can be placed instantly. This is of considerable importance in a machine of this character, where it is frequently required to cut relatively short strips.

The edges of the cutters $a$ $a'$ rest against each other at the corner where they meet, and to prevent any possibility of their springing slightly I provide a stud $a^{35}$, (see Figs. 1 and 3,) against which the lever $a^{16}$ bears as it is shifted forward and backward, and to accommodate different widths of knives $a'$ I make this stud eccentric, so that it may be turned one way or the other to permit the arm $a^{16}$ to be moved correspondingly according to the width of the blade $a'$ being used, the pivotal support $a^{17}$ of the lever $a^{16}$ being adjustably held to permit the same movement by a taper screw $a^{36}$, Fig. 12.

I have already referred to the operation, and it will therefore be sufficient briefly to recapitulate as follows: The wide strip of leather L having been inserted in the machine and the latter set in motion, the cutter-carrier descends, the clamp D meanwhile having coöperated with the clamping operation of the roll C to hold the work and its support rigidly at opposite sides of the cutters, and the two knives $a$ $a'$ cut through the middle of the strip L, making an incision $x$ and a connecting-incision $y$ slantingly or obliquely, said incisions being sharp and clean, due to the thinness of the cutting-blades, the angular position of the leather, its rigid support and taut condition, the cut-receiving surface, or top of the strip, being held under more or less tension by reason of its curved position, so that the knives can cut to the very best advantage for making a clean incision. One cut having been made, the further rotation of the driving-shaft causes the cutters to rise from the leather, and as soon as the pin $c^{13}$ of the arm $c^{14}$ has reached the upper end of the slot $c^{12}$ the feeding mechanism is thereby caused to feed the strip forward for precisely the width of one tooth $z$, the clamping device D having at the same time been released, so as to permit the feeding of the leather. The leather, however, cannot get out of position to the slightest degree, because it is held by the curved shoe $d$ in the cavity between the lip $b^4$ and the opposite edge of the plate $b^2$, and also because of the surface $b^7$ coöperating with the curved shoe $d$ it is held taut while being pulled around by the feeding mechanism. As the cutter-carrier rises the cam $a^{26}$ is automatically turned in the direction of the arrow, Fig. 2, thereby shifting the longitudinal cutter $a'$ outwardly adjacent the outer vertical edge of the knife $a$. The knives or cutters next descend upon the strip, which is then clamped again rigidly and unyieldingly at each side of the knives. As the knives are set at an angle to each other and against each other, they mutually support each other and may be made very thin. On this descending cut a second transverse cut $x$ is made at the distance of the width of one tooth $z$ from the previous cut $x$, and a second longitudinal cut $y$ is made, but not in line with the previous cut $y$, the second cut being made at the opposite end of the transverse cut, thereby forming a second tooth $z$ against the previous tooth $z$, but extending from the other welt-strip. This will be plain upon referring to Fig. 10. At the right end of said figure I have indicated the welts $w$ $w'$ as having long teeth, whereas at the left of said figure the teeth are indicated as shorter, and it will be understood that any length of teeth may be made simply by varying the throw of the cutter, and other changes may be made in the shape of the teeth, for example, by changing the relative angular position of the cutting-blades to each other or the relative length of the teeth by moving the pin $a^{29}$ out or in, while the width of the teeth is changed by the adjustment of the stop $c^{16}$, (the size of the cutting-blade $a'$ being changed also.)

I have not undertaken to indicate all the capabilities of my invention or all the details of operation thereof, but have pointed out the salient features.

The primary object of my invention is the provision of means for simultaneously cutting two welts by connected incisions down the middle of a wide strip. The plan of operation in this form of the machine where the cutters reciprocate is to have the transverse cuts made in succession one in front of the other in the same path or alinement and to have the longitudinal cuts out of successive alinement with each other, said longitudinal cuts when square or blunt ended teeth are made being formed one at one end of one transverse cut and the next at the opposite end of the next transverse cut, the longitudinal cuts being made alternately at the opposite sides of the zigzag line of incision, and by giving the knife $a'$ a lateral movement from one side to the other the cutting at both sides is accomplished by one knife, although I do not limit myself to this preferred embodiment, a single movable knife being preferable, however, to two knives.

The welt, which it is the principal object of my invention to produce, requires that the incision shall extend obliquely to the plane of the welt, as shown in Fig. 11, and preferably, therefore, the work-support is arranged to bring the work on a slant beneath the cutters, as described, although I wish it understood that my invention is not limited to producing this particular form of welt either as to the shape or obliqueness of the teeth, excepting as otherwise required by certain claims.

I prefer to make the feeding device C and the work-support B both move, as indicated by the two arrows, Fig. 1, and to provide a drag or brake upon the strip L, causing the feeding mechanism to pull the welt-strip along against restraint, so that it is always taut and cannot shift or yield its position, the clamp D acting as the brake or restraining device in this instance and constituting means coöperating with the feeding mechanism for holding back the strip against the pull of the latter, and yet as the two surfaces B C move simultaneously it is impossible that the welt can slip or any inaccuracy in feed take place, and as the welt is bent around over the curved support and is tightly clamped on both sides of the cutter just before the cutters touch the leather extreme precision, as well as delicacy of cut, result.

Having described my invention, what I claim as new, and desire to secure by Letters Patent of the United States, is—

1. In a machine of the kind described, means for supporting a strip of leather to be severed into two welt-strips, means for feeding said leather strip step by step, cutting mechanism for incising said strip along its middle, said mechanism including means for cutting, obliquely to the plane of the strip, interlocking teeth on the opposite welt-strips in the severing thereof, and means for clamping said leather strip in place while being cut.

2. In a machine of the kind described, means for supporting a strip of leather to be severed into two welt-strips, means for feeding said leather strip step by step, cutting mechanism for incising said strip along its middle, said mechanism including means for making successive transverse cuts in the same path or alinement along said middle, and means for making longitudinal cuts connecting said transverse cuts but out of successive alinement with each other, and means for clamping said leather strip in place while being cut.

3. In a machine of the kind described, means for supporting a strip of leather to be severed into two welt-strips, means for feeding said leather strip step by step, cutting mechanism for incising said strip along its middle, said mechanism including means for making successive transverse cuts in the same path or alinement along said middle and means for making intervening cuts at an angle to said transverse cuts, said intervening cuts extending, with relation to any one transverse cut, from adjacent the opposite ends thereof and serving to connect adjacent transverse cuts, and means for clamping said leather strip in place while being cut.

4. In a machine of the kind described, means for supporting a strip of leather to be severed into two welt-strips, means for feeding said leather strip step by step, cutting mechanism for incising said strip along its middle, said mechanism including means for simultaneously making a transverse cut and a longitudinal cut extending therefrom, successive transverse cuts being in the same longitudinal path and successive longitudinal cuts being out of alinement with each other adjacent the opposite ends of the transverse cuts, and means for clamping said leather strip in place while being cut.

5. In a machine of the kind described, means for supporting a strip of leather to be severed into two welt-strips, means for feeding said leather strip step by step, cutting mechanism for severing said strip along its middle by a series of connected transverse and longitudinal incisions, said cutting and feeding mechanisms coöperating to make a transverse cut with a longitudinal cut extending forward from adjacent one end thereof, and then a second transverse cut extending at one end from the free end of said longitudinal cut, with a second longitudinal cut extending forward at its other end.

6. In a machine of the kind described, means for supporting a strip of leather to be severed into two welt-strips, means for feeding said leather strip step by step, cutting mechanism for incising said strip along its middle, said mechanism including a transverse cutter for making successive transverse cuts, an independently-movable longitudinal cutter for making longitudinal cuts connecting said transverse cuts, and means for shifting said longitudinal cutter laterally of the strip for making its successive cuts out of alinement with each other.

7. A machine for making a welt, with one edge thin in stock transversely by being cut away to leave overlapping teeth separated by intervening spaces, comprising a work-support, feeding mechanism for feeding the welt-strip, and teeth-cutting mechanism for cutting overlapping teeth at one edge of a welt-strip, and including means for cutting away the intervening leather between the overlapping edges of adjacent teeth.

8. In a machine of the kind described, means for supporting a welt-strip to be cut, means for holding said welt-strip, and cutting mechanism, including cutting-knives, held angularly against and mutually supporting each other, to make an angular incision.

9. In a machine of the kind described, means for supporting a welt-strip to be cut, means for holding said welt-strip, cutting mechanism, including cutting-knives, held angularly against and mutually supporting each other, to make an angular incision, and means for adjusting one of said knives toward and from the other.

10. In a machine of the kind described, means for supporting a welt-strip to be cut, means for holding said welt-strip, cutting mechanism, a reciprocating carrier, a knife-block and knife secured thereto, a second knife and arm carrying the same to coöperate with said first-mentioned knife, and means for moving said second knife toward one edge and then the other of the first knife in alternate reciprocations.

11. In a machine of the kind described, means for supporting a welt-strip to be cut, means for holding said welt-strip, cutting mechanism, a reciprocating carrier, a knife-block and knife secured thereto, a second knife and arm carrying the same and mounted on said carrier to coöperate with said first-mentioned knife, and means for moving said second knife toward one edge and then the other of the first knife in alternate reciprocations.

12. In a machine of the kind described, a welt-strip support, feeding mechanism, a reciprocating carrier provided with two knives angularly arranged to each other, one of said knives being pivotally mounted on said carrier, and a cam device automatically operated by the reciprocation of said carrier for swinging said pivoted knife alternately out and in.

13. In a machine of the kind described, a welt-strip support, feeding mechanism, a reciprocating carrier provided with two knives angularly arranged to each other, one of said knives being pivotally mounted on said carrier, a cam device automatically operated by the reciprocation of said carrier for swinging said pivoted knife alternately out and in, and means for varying the swing of said pivoted knife.

14. In a machine of the kind described, reciprocating welt-cutting mechanism, a work-support, and means for intermittingly feeding the welt-strip for successive cuts, and automatic means for clamping the welt-strip at the opposite sides of the cutters for each cutting operation and thereafter releasing it.

15. In a machine of the kind described, reciprocating welt-cutting mechanism, a work-support, means for intermittingly feeding the welt-strip for successive cuts, and means for holding the welt-strip under tension for each cutting operation.

16. In a machine of the kind described, reciprocating welt-cutting mechanism, a work-support, having a curved surface, beneath said welt-cutting mechanism, and automatic intermitting clamping means for alternately clamping and releasing the welt-strip on said curved surface for each cut.

17. In a machine of the kind described, reciprocating welt-cutting mechanism, a rotary work-support opposite said cutting mechanism for the latter to cut against, a rotary feeding device, and clamping means for holding said work-support stationary during each cutting operation, the work being carried and cut on said rotary support, said support and feeding device rotating in unison for feeding said strip between them.

18. In a machine of the kind described, reciprocating welt-cutters, a work-support having its supporting-surface extending obliquely to said cutters at the point of impact of the latter thereon, clamping means for holding the leather strip immovably on said work-support when being cut, and means for releasing said clamping means from said leather at other times.

19. In a machine of the kind described, reciprocating welt-cutting mechanism, a work-support, a longitudinal guide for directing a leather strip beneath said cutting mechanism, a cutting-surface for receiving and supporting the leather strip in said guide, said cutting-surface consisting of material, substantially as described, capable of supporting the strip unyieldingly and yet permitting the cutters to make a clean cut through the leather, and means for moving said cutting-surface and leather strip forward step by step for successive cuts.

20. In a machine of the kind described, reciprocating cutting mechanism, a rotary work-support having a peripheral guideway for engaging the edges of a leather strip and guiding the same to be cut, a removable cutting-surface in the bottom of said guideway, and means for removably clamping said cutting-surface on said rotary support, means for clamping the work while being cut and holding said support stationary, and feeding mechanism for feeding the work.

21. In a machine of the kind described, reciprocating cutting mechanism, a curved work-support, means operating on the leather strip at one side of said cutting mechanism for pulling the leather strip forward to be cut, and means operating on the strip at the other side of said cutting mechanism for retarding or preventing free forward movement of the leather strip.

22. In a machine of the kind described, a reciprocating cutting mechanism, a movable work-support, a clamp at one side of said cutting mechanism for clamping the work on said work-support, and a feed device at the other side of said cutting mechanism, said feed device pressing directly on the work and moving the work and work-support forward for successive cuts.

23. In a machine of the kind described, a reciprocating cutting mechanism, a work-support for supporting a leather strip to be cut, and feeding mechanism, including means positively holding said work unremittingly in forward position and intermittingly feeding the same.

24. In a machine of the kind described, a reciprocating cutting mechanism, a work-support for supporting a leather strip to be cut, feeding mechanism, including means positively holding said work unremittingly in forward position and intermittingly feeding the same, and means for varying the extent of feed.

25. In a machine of the kind described, a rotary work-support, welt-cutting mechanism, including a reciprocating carrier, welt-feeding mechanism, including a roll yieldingly pressed toward said rotary support, the welt-strip being clamped between the two, said carrier having an arm projecting therefrom, and said feeding mechanism having a ratchet device provided with a link connected to said arm for being intermittingly operated thereby.

26. In a machine of the kind described, a rotary work-support, welt-cutting mechanism, including a reciprocating carrier, welt-feeding mechanism, including a roll yieldingly pressed toward said rotary support, the welt-strip being clamped between the two, said carrier having an arm projecting therefrom, and said feeding mechanism having a ratchet device provided with a link connected to said arm for being intermittingly operated thereby, said link and arm having a provision for lost motion, and an adjustable stop device in connection with said ratchet device having an adjustable stop for limiting the feeding operation thereof.

27. In a machine of the kind described, a cutting mechanism, a rotary work-support for carrying a leather strip to said cutting mechanism, a feeding mechanism, including a feed-roll held yieldingly in pressing rotative relation with said rotary work-support, the leather strip being passed between the work-support and feed-roll, and means for instantly separating said work-support and feed-roll for introducing a fresh strip of leather to be cut.

28. In a machine of the kind described, welt-cutting mechanism, a work-support for guiding a leather strip to be cut thereon, a clamping device for clamping said leather strip on said support, said clamping device including automatic means for intermittingly operating the same, said clamping device being clamped when said cutting mechanism is cutting against said work-support and mechanism for permitting the same to yield, when in clamping position, for different thicknesses of leather strips.

In testimony whereof I have signed my name to this specification in the presence of two subscribing witnesses.

WILLIAM B. ARNOLD.

Witnesses:
  GEO. H. MAXWELL,
  W. C. HENSER.